United States Patent [19]
Ukegawa et al.

[11] Patent Number: 5,631,200
[45] Date of Patent: May 20, 1997

[54] SINTERED SILICON NITRIDE-BASED BODY

[75] Inventors: Harutoshi Ukegawa; Matsuo Higuchi, both of Itami, Japan

[73] Assignee: Sumitomo Electric Industries, Ltd., Japan

[21] Appl. No.: 597,705

[22] Filed: Feb. 7, 1996

[30] Foreign Application Priority Data

| Feb. 8, 1995 | [JP] | Japan | 7-020250 |
| Apr. 21, 1995 | [JP] | Japan | 7-096379 |
| Dec. 26, 1995 | [JP] | Japan | 7-338777 |

[51] Int. Cl.[6] .................... C04B 35/587; C04B 35/599
[52] U.S. Cl. ........................................ 501/97; 501/98
[58] Field of Search ............................. 501/97, 98

[56] References Cited

U.S. PATENT DOCUMENTS

| 4,401,617 | 8/1983 | Ezis et al. | |
| 4,848,984 | 7/1989 | Ezis et al. | 501/97 |
| 5,096,859 | 3/1992 | Sakai et al. | 501/97 |
| 5,114,889 | 5/1992 | Osamura et al. | 501/97 |
| 5,128,287 | 7/1992 | Peuckert | 501/97 |
| 5,316,856 | 5/1994 | Suzuki et al. | 501/97 |

OTHER PUBLICATIONS

Chem. Abstracts, vol.115,No.16, Oct. 21, 1991 Ohio US; Abstract No. 164977, T. Awazu et al XP002011197.

Abstract & JP-A-03 122 055 Sumitomo, May 24, 1991
Patent Abstract of Japan XP002011455 & JP-A05-148 027.

Kyocera Corp. Jun. 15, 1993 Abstract Examples 18,20.

*Primary Examiner*—Karl Group
*Attorney, Agent, or Firm*—Bierman, Muserlian and Lucas LLP

[57] ABSTRACT

A sintered silicon nitride-based body comprising 20% or less by weight of a grain boundary phase and the balance being a major phase of grains of silicon nitride and/or sialon, wherein the major phase contains a grain phase of a $\beta$-$Si_3N_4$ phase and/or a $\beta'$-sialon phase, and a quantitative ratio of the grain phase of the $\beta$-$Si_3N_4$ phase and/or the $\beta'$-sialon phase is in a range of 0.5 to 1.0 relative to the major phase; the grain boundary phase contains $Re_2Si_2O_7$ (wherein Re represents a rare-earth element other than Er and Yb) as a first crystal component and at least one of $ReSiNO_2$, $Re_3Al_5O_{12}$, $ReAlO_3$, and $Si_3N_4 \cdot Y_2O_3$ as a second crystal component; and a quantitative ratio of the first and second crystal components in the grain boundary phase to the grain phase of $\beta$-$Si_3N_4$ phase and/or the $\beta'$-sialon phase ranges from 0.03 to 1.6. The sintered body is produced by mixing a specific sintering aid and silicon nitride-based powder, sintering the mixture and heat treating the sintered body for nucleation and crystal growth within the temperature range of from 1050° to 1550° C.

2 Claims, 4 Drawing Sheets

SINTERED SILICON NITRIDE-BASED BODY

BACKGROUND OF THE INVENTION

1. Field of the Invention

The present invention relates to a sintered silicon nitride-based body which can be used advantageously for cutting tools, wear-resistant tools, and parts for mechanical structures required to have a high strength and a high toughness at a high temperature, and to a process for producing the same.

2. Description of the Prior Art

Sintered silicon nitride-based bodies are expected as materials for cutting tools, wear-resistant tools, parts for mechanical structures and wear-resistant parts required to have a heat resistance and a high strength.

Silicon nitride as such is poor in sinterability and a sintering aid component such as $Y_2O_3$ or $Al_2O_3$ is thus added thereto conventionally. Mass transfer due to the formation of a liquid phase of the aid component results in a densified sintered silicon nitride body. However, since a major part of the liquid-phase forming component other than $Si_3N_4$ is converted into a glass phase and forms a grain boundary phase with the typical liquid phase sintering alone, the glass phase is softened to reduce the strength significantly under a high temperature of 1200° C. or higher.

For example, according to Japanese Patent Publication No. 56-28865, an $Si_3N_4 \cdot Y_2O_3$ crystal phase is precipitated in the grain boundary during sintering. A bending strength at 1300° C. is as small as about 75–93 kg/mm². Alternatively, sintering is made with the addition of $ReAlO_3$ or $Re_3Al_5O_{12}$ (wherein Re is a rare-earth element) in Japanese Patent Laid-open No. 60-186469. A bending strength thereof is around 70 kg/mm² even at a room temperature. In Japanese Patent Laid-open No. 4-130062, the addition of a $Y_2O_3$-$Al_2O_3$-based sintering aid such as YAG results in a sintered body of higher than 100 kg/mm² at a room temperature. The strength is, however, around 80 kg/mm² at 1200° C.

As described above, the grain boundary phase is a glass phase, so that the strength, especially the strength at a high temperature, of the sintered $Si_3N_4$ body is reduced significantly. With this respect, various trials have been made to improve the strength at a high temperature by means of crystallizing the glass phase. For example, in Japanese Patent Publication No. 52-45724, a small amount of $TiO_2$ is added as a crystallization promoter and the sintering is conducted with $SiO_2$ as well as $Al_2O_3$ used as the sintering aids, after which the heating treatment is conducted at 700°–1400° C. to precipitate crystals such as cordierite and cristobalite. This provides the one having a bending strength of 60 kg/mm² at 1200° C.

In addition, Japanese Patent Laid-open No. 3-122055 discloses such a process that fine crystals of $Si_3N_4 \cdot Y_2O_3$ or $Si_2N_2O$ are precipitated by using a heat treatment program in which it is held at 900°–970° C. during being cooled after $Al_2O_3$ and $Y_2O_3$ are added, and then the temperature is increased to 1200°–1300° C. The bending strength of the resultant sintered body is only around 67 kg/mm² at 1200° C.

Japanese Patent Laid-open No. 3-199165 describes to control a cooling rate after sintering and thereby to form an $Re_2O_3$ (wherein Re is a rare-earth element) —$SiO_2$-based grain boundary phase in which $Si_2N_2O$ crystals are precipitated. The bending strength thereof is, however, 83–99 kg/mm² at an ordinary temperature and is 51–63 kg/mm² at 1400° C. Japanese Patent Laid-open No. 4-231379 describes to form $Si_2N_2O$ crystals into a grain boundary phase by means of heat treatment at 1200° C. after the sintering, which allows production of such a sintered $Si_3N_4$ body that has a strength of around 100 kg/mm² at a room temperature and of around 63 kg/mm² at 1400° C. Japanese Patent Laid-open No. 5-294731 describes that a sintered body can be obtained that has a strength of 50 kg/mm² or higher at 1400° C. and a toughness value of 5 or larger in $K_{IC}$ can be obtained by forming a composite crystal phase of $Re_2O_3$ (wherein Re is a rare-earth element) and $ZrSiO_4$ by a heat treatment at 1500° to 1700° C. Japanese Patent Laid-open No. 5-330919 describes to form fine crystals based on Al-Yb-Si-O-N or Al-Er-Si-O-N in the crystal phase through the nucleation at 850°–1050° C. and the crystal growth at 1100°–1500° C. to obtain a sintered body having a bending strength of around 60 kg/mm² at 1300° C.

In addition, Japanese Patent Laid-open No. 5-58740 describes to precipitate an oxide crystal phase based on $Y_2O_3$-$Al_2O_3$-$SiO_2$ such as $Y_2Si_2O_7$, $Al_5Y_3O_{12}$, or $Al_6Si_2O_{13}$ and thereby to obtain a sintered $Si_3N_4$ body having a bending strength of around 50 kg/mm² at a room temperature by means of a method in which MgO or $TiO_2$ is added as a nucleation agent and the sintering is conducted with $Y_2O_3$ and $Al_2O_3$ as the sintering aids, after which a sintered body is nucleated at 850°–1050° C. and crystal-grown at 1200°–1300° C.

As mentioned above, various trials have been made to improve the strength at a high temperature and the toughness by means of combining the components and amount of the sintering aid(s), and crystallization treatment conditions, which is still insufficient to satisfy high temperature properties required for tools in recent years.

SUMMARY OF THE INVENTION

With respect to these conventional problems an object of the present invention is to provide a sintered silicon nitride-based body which is superior in strength at a high temperature and a fracture toughness to conventional ones by means of precipitating crystals in a grain boundary phase, and a process for producing the same.

In order to achieve the above mentioned object, a sintered silicon nitride-based body provided by the present invention is a sintered silicon nitride-based body comprising 20% or less by weight of a grain boundary phase and the balance being a major phase of grains of silicon nitride and/or sialon, wherein the major phase contains a grain phase formed of a $\beta$-$Si_3N_4$ phase and/or a $\beta'$-sialon phase, and a quantitative ratio of the grain phase of the $\beta$-$Si_3N_4$ phase and/or the $\beta'$-sialon phase is in a range of from 0.5 to 1.0 relative to the major phase;

the grain boundary phase contains $Re_2Si_2O_7$ (wherein Re represents a rare-earth element other than Er and Yb, which applies hereinbelow) as a first crystal component and at least one of $ReSiNO_2$, $Re_3Al_5O_{12}$, $ReAlO_3$, and $Si_3N_4 \cdot Y_2O_3$ as a second crystal component; and a quantitative ratio of these crystal components in the grain boundary phase to the grain phase formed of $\beta$-$Si_3N_4$ phase and/or the $\beta'$-sialon phase in the major phase is in a range of from 0.03 to 1.6.

The quantitative ratio of the grain phase formed of the $\beta$-$Si_3N_4$ phase and/or a $\beta'$-sialon phase relative to the major phase represents a ratio of the sum of main peak intensities measured by X-ray diffraction for crystal grains of $\beta$-$Si_3N_4$ and the $\beta'$-sialon relative to the sum of the main peak intensities measured by X-ray diffraction for all crystal grains of $Si_3N_4$ and sialon forming the major phase.

In addition, the quantitative ratio of the crystal components in the grain boundary phase to the grain phase formed of the $\beta$-$Si_3N_4$ phase and/or the $\beta'$-sialon phase in the major phase means a ratio of the sum of the main peak intensities, measured by X-ray diffraction, for all crystal phases in the grain boundary phase relative to the main peak intensity of $\beta$-$Si_3N_4$ (i.e., the peak intensity of (200) indicated in a JCPDS33-1160 card for $\beta$-$Si_3N_4$) and/or the corresponding X-ray diffraction main peak intensity of $\beta'$-sialon. Hereinafter, a peak intensity measured by X-ray diffraction is referred to as an X-ray diffraction peak intensity.

A process for producing a sintered silicon nitride-based body according to the present invention comprises:

mixing from 80% to 98% by weight of silicon nitride-based powder and 2% to 20% by weight of at least any one sintering aid powder selected from the group consisting a) a powder mixture of monocompounds which is a combination of $Re_2O_3$ (wherein Re represents a rare-earth element other than Er and Yb, which applies hereinbelow) powder and at least one powder selected from the group consisting of AlN, ReN, $SiO_2$, $Al_2O_3$ and $M_xO_y$ (wherein MxOy represents an oxide and M represents Li, Na, Ca, Mg, or a rare-earth element other than Er and Yb), b) a powder of a composite compound having a combined composition of the single monocompounds, and c) a mixture of the powder mixture a) and/or the powder b) with the addition of $Si_3N_4 \cdot Y_2O_3$ powder;

sintering, in a pressurized nitrogen atmosphere, a compact compacted from the resultant starting powders, and thereafter;

subjecting the resultant sintered body to heat treatment at a temperature range of from 1050° to 1550° C. in a non-oxidizing atmosphere for nucleation and crystal growth.

If an eutectic point corresponding to the foregoing combined composition of monocompounds is within this temperature range, the heat treatment up to the crystal nucleation and the crystal growth is conducted within the temperature region of from 1050° C. to the eutectic point.

DETAILED DESCRIPTION OF THE PREFERRED EMBODIMENTS

Figure 1:
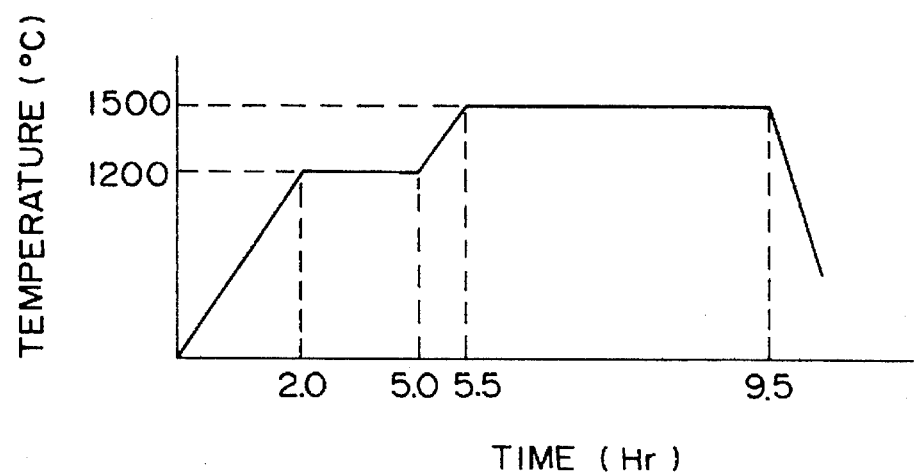
FIG. 1 is a graphical representation showing a heat treatment program for the crystallization used in Example 1.

A sintered silicon nitride-based body according to the present invention comprises, as mentioned above, 20% or less by weight of a grain boundary phase and a crystal grain phase of silicon nitride and/or sialon which is a major phase as the balance. When the crystal grain phase of silicon nitride and/or sialon as the major phase is less than 80% by weight, i.e., when the grain boundary phase is more than 20% by weight, no sufficient strength is obtained even when the grain boundary phase contains crystal components. The grain boundary phase of less than 2% by weight, i.e., the major phase of more than 98% by weight, is not preferable from the viewpoint that this may make densification by sintering difficult.

Combinations of the major phase comprising silicon nitride and/or sialon are as follows, and typical combinations are given in Table 1 below.

TABLE 1

| Combination | Silicon Nitride | | Sialon | |
|---|---|---|---|---|
| | α-phase | β-phase | α'-phase | β'-phase |
| 1 | — | — | — | o |
| 2 | — | — | o | o |
| 3 | o | — | — | o |
| 4 | o | — | o | o |
| 5 | — | o | o | — |
| 6 | — | o | — | o |
| 7 | — | o | o | o |
| 8 | o | o | o | — |
| 9 | o | o | — | o |
| 10 | o | o | o | o |
| 11 | — | o | — | — |
| 12 | o | o | — | — |

(Note)
o indicates an existing phase

In addition, it is necessary that the quantitative ratio ($\beta$, $\beta'$ quantitative) of $\beta$-$Si_3N_4$ and/or $\beta'$-sialon in the crystal grains relative to all crystal grains, i.e., the ratio of X-ray diffraction peak intensity I obtained by the following equation 1 be in the range of from 0.5 to 1 in the foregoing major phase comprising the crystal phase of silicon nitride and/or sialon. With the quantitative ratio of $\beta$-$Si_3N_4$ and/or $\beta'$-sialon ($\beta$, $\beta'$ quantitative ratio) of smaller than 0.5 a network structure of $\beta$-$Si_3N_4$ and/or $\beta$-sialon is not formed sufficiently and no product having a high toughness can be obtained because of increased equi-axed $\alpha$-$Si_3N_4$ and/or $\alpha'$-sialon.

$\beta$, $\beta'$ quantitative ratio = [I($\beta$-$Si_3N_4$) +         [Equation 1]

I($\beta'$-sialon)]/[I($\alpha$-$Si_3N_4$) + I($\beta$-$Si_3N_4$) + I($\alpha'$-sialon) + I($\beta'$-sialon)], wherein I($\alpha$-$Si_3N_4$), I($\beta$-$Si_3N_4$), I($\alpha'$-sialon) and I($\beta'$-sialon) are X-ray diffraction main peak intensities of $\alpha$-$Si_3N_4$, $\beta$-$Si_3N_4$, $\alpha'$-sialon and $\beta'$-sialon, respectively, in the major phase.

In this event, $\alpha'$-sialon and $\beta'$-sialon are those represented by general formulae $M_x(Si, Al)_{12}(O, N)_{16}$ (wherein 0<x≤2) and $Si_{6-z}Al_zN_{8-z}$ (wherein 0<x≤4.2), respectively. In the above general formulae, M indicates Na, Li, Mg, Ca or a rare-earth element.

It is preferable that the grains of $\beta$-$Si_3N_4$ or $\beta'$-sialon have an average size in the major axis of from 0.4 to 10 µm, and an aspect ratio of from 1.4 to 10. More specifically, when the grains of $\beta$-$Si_3N_4$ or $\beta'$-sialon in the major phase become too small, or has a shape similar to an equi-axed crystal, the number of joints of the network structure of $\beta$-$Si_3N_4$ or $\beta'$-sialon becomes large, so that the shock resistance and the toughness are less improved as compared with those within the above mentioned range, while it becomes more difficult to obtain a denser sintered body as compared with those within the above mentioned range when the β-$Si_3N_4$ or β'-sialon grains are excessively large or have an excessively long size, as a result of which the strength and the toughness are less improved.

On the other hand, the grain boundary phase should contain $Re_2Si_2O_7$ (Re means a rare-earth element other than Er and Yb hereinbelow) as a first crystal component, and contains, as a second crystal component, at least one of $ReSiNO_2$(ReN.$SiO_2$), $Re_3Al_5O_{12}$($3Re_2O_3.5Al_2O_3$), $ReAlO_3$($Re_2O_3.Al_2O_3$), and $Si_3N_4.Y_2O_3$. As the first crystal component $Y_2Si_2O_7$ is preferable while the second crystal component preferably have a composition in which Re is Y.

As a quantitative index of each crystal component in these grain boundary phases, it is necessary to control the quantitative ratio of these crystal components in the grain boundary phase to the β-$Si_3N_4$ phase and/or the β'-sialon phase in the major phase of, i.e., a ratio of the total sum of the X-ray diffraction main peak intensities of all crystal phases in the grain boundary phase relative to the X-ray diffraction main peak intensity of (200) indicated in a JCPDS33-1160 card of β-$Si_3N_4$ and/or the corresponding X-ray diffraction main peak intensity of β'-sialon, within the range of from 0.03 to 1.6. When this grain boundary crystal quantitative ratio is smaller than 0.03, no fine crystal of the foregoing combination is generated in the grain boundary phase nor the generated amount thereof is small, deteriorating all the strength at a high temperature, the toughness, and the abrasion-resistance. On the contrary, this quantitative ratio of the crystal components larger than 1.6 reduces the relative amount of $Si_3N_4$ or sialon in the sintered body, making it impossible to provide a sufficient strength.

The sintered silicon nitride-based body according to the present invention containing the crystal components mentioned above in the grain boundary phase has a high strength and a superior high toughness as those can be provided stably that have a bending strength of 1170 MPa or higher at a room temperature and a bending strength of 880 MPa or higher at 1300° C., and a fracture toughness value $K_{IC}$ of 6.5 $MPa^{3/2}$ or larger at a room temperature.

This sintered silicon nitride-based body of the present invention may be produced with a method of which features are in combination of a starting material of silicon nitride-based powder and a specific sintering aid system to be mixed therewith, and in a heat treatment step after the sintering. First, the silicon nitride-based powder which is the starting material preferably contains 50% or less of β-$Si_3N_4$ and/or β'-sialon. This proportion of β-$Si_3N_4$ phase and/or the β'-sialon may be a β-percentage in single powder, or may be achieved with a mixture of α-$Si_3N_4$ powder and β-Si3N4 powder in the case of the $Si_3N_4$ powder.

A sintering aid-based powder is added to such silicon nitride-based powder. Used as the sintering aid-based powder is a combination of $Re_2O_3$ (wherein Re represents a rare-earth element other than Er and Yb, which applies hereinbelow) powder and at least one of individual powders of AlN, ReN, $SiO_2$, $Al_2O_3$ and $M_xO_y$ (wherein $M_xO_y$ represents an oxide and M represents Li, Na, Ca, Mg, or a rare-earth element other than Er and Yb). In addition, $Si_3N_4.Y_2O_3$ powder may further be added thereto.

As the form of the sintering aid-based powder, it may be added in the form of the above mentioned each monocompound of, for example, $Re_2O_3$ AlN, ReN, $SiO_2$, $Al_2O_3$ and $M_xO_y$ as is done conventionally. In this specification, the term "monocompound" means a compound containing one kind of metal element, unless otherwise specified. However, it is more preferable to add in the form of a composite compound having an arbitrary composition which is a combination of $Re_2O_3$ and at least one other monocompound. By adding in the form of such composite compound, the sintering proceeds more homogeneously as compared with a case where it is added as the monocompounds as conventionally practiced and a composite compound is made to be formed during sintering. The composite compound allows densification at a lower temperature. As a result, $Si_3N_4$ or sialon grains in the major phase also become fine, and it is possible to provide a sintered body superior in, for example, strength, toughness, and wear-resistance.

Figure 3:
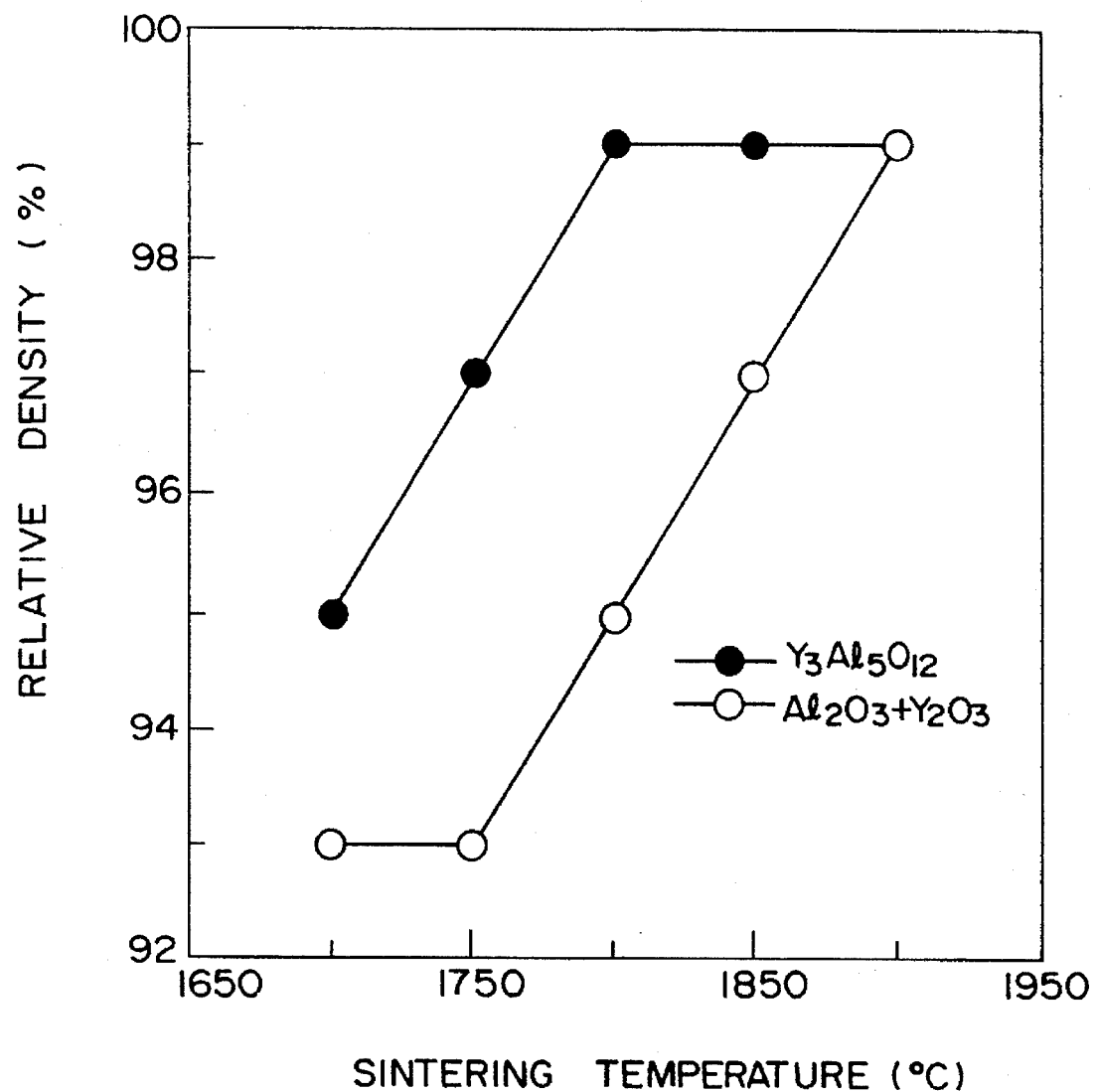
FIG. 3 is a graphical representation showing a difference in sintering properties between the cases where monocompounds are used as the sintering aid and where a combination thereof as a composite compound is used.

For example, FIG. 3 is an example showing the form of sintering aid-based powder added and a difference in effect thereof. It can be understood that the sintering temperature is lower by approximately 100° C. and densification can be done at a lower temperature when 5 moles of $Al_2O_3$ and 3 moles of $Y_2O_3$ are added as a composite compound $Y_3Al_5O_{12}$ than when 5 moles of $Al_2O_3$ and 3 moles of $Y_2O_3$ are each added as monocompounds. If necessary, the monocompound and the composite compound may be added together. For example, a sintered sialon-based or $Si_3N_4$-sialon-based body can be produced when the composite compound $Y_3Al_5O_{12}$ and the monocompounds AlN are added together.

A mixing ratio of the silicon nitride-based powder and the sintering aid-based powder is from 80% to 98% by weight of the silicon nitride-based powder and from 2% to 20% by weight of the sintering additive-based powder. When the amount of the sintering additive-based powder exceeds 20% by weight, the amount of the silicon nitride-based powder becomes too small. As a result, only a brittle sintered body can be obtained and thus the strength is deteriorated suddenly at a high temperature. When the amount of the sintering additive-based powder is less than 2% by weight the amount of the sintering additive is too small and thus sintering cannot proceed well.

The above mentioned silicon nitride-based powder and the sintering aid-based powder are mixed in a usual manner, and the mixed powders are compacted by various compact methods. The compact is formed into a sintered silicon nitride-based body by sintering in a pressurized nitrogen atmosphere. In the present invention, the resultant sintered body is further subjected to heat treatment for the nucleation and the crystal growth, and, thereby, the final grain boundary phase contains the aforestated crystal components and satisfies the quantitative index therefor. By means of further densification treatment of the sintered body in a high pressure nitrogen atmosphere of from 50 to 1000 atm, the sintered body becomes denser and has a higher strength.

The heat treatment temperature for the sintered silicon nitride-based body is within a temperature range between 1050° C. and 1550° C. both inclusive. In this temperature range, realized are the formation of nuclei to be the crystal components of the grain boundary phase and the crystal growth of these nuclei. The reason why the heat treatment atmosphere is a non-oxidizing atmosphere is to avoid oxidation of a surface of the sintered body and reduction in strength. In addition, the reason why the above mentioned heat treatment temperature is from 1050° C. to 1550° C. are that no nuclei of crystal is formed in the grain boundary phase at lower than 1050° C. while grains in the major phase are grown abnormally or a sintered body may possibly be sublimated at higher than 1550° C. If an eutectic point corresponding to a composition of monocompounds combined as the sintering aid-based powder is within this temperature range, the heat treatment is conducted within the temperature region of from 1050° C. to the eutectic point.

As a preferred embodiment of the above mentioned heat treatment step, the nucleation is conducted at 1050°–1400° C. for 0.5–12 hours, after which the temperature is increased and the crystal growth is conducted at a temperature range of from the nucleation treatment temperature +150° C. to 1550° C. (or the eutectic point corresponding to the composition of the combined monocompounds).

As mentioned above, it becomes possible through these two steps to crystallize more grain boundary phases which are glass phases during sintering, and to thereby improve the high-temperature strength, the toughness and the wear-resistance of the sintered body as compared with a one-step. More specifically, it is possible to stably obtain a sintered body having a bending strength of 1200 MPa or higher at a room temperature, a bending strength of 900 MPa or higher at 1300° C., and a fracture toughness value $K_{IC}$ of 7.0 $MPa^{3/2}$ or larger at a room temperature.

In the above mentioned nucleation step, when the nucleation is made in nucleation conditions of lower than 1050° C. or shorter than 0.5 hours, no combination of the necessary crystal components and the quantitative index thereof cannot be satisfied at a nucleation temperature of higher than 1400° C. In addition, the amount of nuclei formed is not increased even if the nucleation time 12 hours. Therefore, it is preferable to be within 12 hours.

In the subsequent crystal growing step, the crystal nuclei are not grown sufficiently when the crystal growing temperature is lower than the nucleation treatment temperature plus 150° C. On the other hand, when the crystal growing temperature exceeds 1550° C. or exceeds an eutectic point corresponding to the composition of the combined monocompounds, any crystal component having a desired composition cannot be obtained in the grain boundary phase or the sintered body may possibly be sublimated. The time in for the crystal growing is preferably from 0.5 to 24 hours. This is because the crystallization does not proceed for shorter than 0.5 hours and thus the desired properties cannot be obtained, while the surface of the sintered body becomes rough as well as the crystallization no longer proceeds for longer than 24 hours.

By repeating successively several times (two times or more) the heat treatment step for the nucleation and the crystal growth, preferably the heat treatment step comprising the above mentioned two steps, within the above specified upper limit of time, while ticking the program of the time for one cycle and the temperature within the range, the crystallization of the grain boundary phase further proceeds and thus the strength at a high temperature, the toughness, and the wear-resistance of the sintered body are further improved. More specifically, as a result of the repeated heat treatments, those can be provided stably that have a bending strength of 1300 MPa or higher at a room temperature and a bending strength of 940 MPa or higher at 1300° C., and a fracture toughness value $K_{IC}$ of 8.6 $MPa^{3/2}$ or larger at a room temperature.

The heat treatment step may be conducted during the cooling step of the sintering step for obtaining sintered bodies. Alternatively, it may be separated from the sintering step and be conducted after machining or coating treatment on the sintered body obtained by sintering. In particular, such a secondary effect can be obtained that cracks and defects in the surface during machining are reduced because of the healing effect when the heat treatment is conducted after the machining. In addition, the temperature may be increased to the temperature at which the liquid phase is generated in the grain boundary phase and held thereat previously before the crystal nucleation step is conducted, after which it is cooled to the crystal nucleation temperature for the crystal nucleation step and the crystal growth step.

EXAMPLE 1

$\alpha$-$Si_3N_4$ powder having an average grain size of 0.7 μm, $\beta$-$Si_3N_4$ powder having an average grain size of 1.5 μm, and, as sintering aid, a composite compound $Y_3Al_5O_{12}$ powder having an average grain size of 0.8 μm, and AlN powder or MgO powder having an average grain size of 1.0 μm were mixed at proportions shown in Table 2 below. In this event, the composite compound $Y_3Al_5O_{12}$ was produced by firing, at 1150°–1650° C., $Y_2O_3$ and $Al_2O_3$ mixed at a molar ratio of 3:5.

Three parts by weight of polyethylene amine as a dispersing agent and 120 parts by weight of ethanol as a solvent were added to 100 parts by weight of each of the powder and mixed homogeneously by using alumina balls. The resultant mixture was then dried and press compacted to have a rectangular parallelopiped shape. Each compact was heated in vacuum to 600° C., and held for 1 hour to degrease.

Next, each compact was sintered at 1800° C. for 4 hours in a pressurized nitrogen atmosphere of 6 atm to obtain a respective sintered silicon nitride-based body. The resultant sintered body was machined into a transverse test piece shape, after which heat treatment was conducted other than on sample 4 for 3 hours at 1200° C. and for subsequent 4 hours at 1500° C. in a nitrogen atmosphere of 1.5 atm according to the program shown in FIG. 1. For sample 7 the heat treatment was conducted for 7 hours at 1500° C. in the same atmosphere.

TABLE 2

| Sample | $Si_3N_4$ powder (wt. %) | | $Y_3Al_5O_{12}$ (wt. %) | AlN (wt. %) | MgO (wt. %) |
| --- | --- | --- | --- | --- | --- |
| | α-type | β-type | | | |
| 1 | 95 | 0 | 4 | 1 | 0 |
| 2 | 86 | 8 | 4 | 1 | 1 |
| 3 | 50 | 32 | 17 | 1 | 0 |
| 4* | 60 | 33 | 5 | 1 | 1 |
| 5* | 48 | 27 | 24 | 1 | 0 |
| 6* | 63 | 36 | 1 | 0 | 0 |
| 7 | 95 | 0 | 4 | 1 | 0 |

(Note)
Samples with * in the table are comparative examples.

For each sintered body after the heat treatment, the combination of $Si_3N_4$ and sialon in the major phase, the quantitative ratio (hereinafter, referred to as a β, β' quantitative ratio) of β-$Si_3N_4$ and/or β'-sialon in the major phase were obtained by means of the X-ray diffraction method. The quantitative ratio of β-$Si_3N_4$ and/or β'-sialon was obtained by the equation 1 previously defined. Furthermore, crystal components contained in the grain boundary phase were obtained. Results are given in Table 3. The major phase of each sintered body is a combination of α-$Si_3N_4$ and β'-sialon for samples 1, 3, 5, and 7, a combination of α'-sialon and β'-sialon for samples 2 and 4, and a sintered body formed of $Si_3N_4$ alone for a sample 6.

The "elements dissolved" in the table means that elements dissolves in the state of a solid solution.

TABLE 3

| Sample | β, β' quantitative ratio | Element dissolved in α' sialon | Crystal components in grain boundary phase |
| --- | --- | --- | --- |
| 1 | 0.82 | — | Y$_2$Si$_2$O$_7$, YSiNO$_2$ |
| 2 | 0.85 | Mg | Y$_2$Si$_2$O$_7$, YSiNO$_2$ |
| 3 | 0.91 | — | Y$_2$Si$_2$O$_7$, YSi$_3$N$_4$O$_3$ |
| 4* | 0.93 | Mg | None |
| 5* | 0.98 | — | Y$_2$Si$_2$O$_7$ |
| 6* | 0.96 | — | Y$_2$SiO$_5$ |
| 7 | 0.82 | — | Y$_2$Si$_2$O$_7$, YAlO$_3$ |

(Note)
Samples with * in the table are comparative examples.

In addition, relative density, three-point bending strength at an ordinary temperature and at 1300° C., fracture toughness $K_{IC}$, and thermal shock resistance were measured on the resultant sintered body of each sample. The results are given in Table 4 below.

TABLE 4

| | Bending strength (kg/mm$^2$) | | Fracture toughness (MPa$^{3/2}$) | | Relative density (%) | Thermal shock resistance (°C.) |
| --- | --- | --- | --- | --- | --- | --- |
| Sample | Ordinary temperature | 1300° C. | Ordinary temperature | 1300° C. | | |
| 1 | 123 | 94 | 7.6 | 5.8 | 99.6 | 1100 |
| 2 | 122 | 92 | 7.8 | 5.7 | 99.2 | 1100 |
| 3 | 126 | 92 | 7.7 | 5.8 | 99.5 | 1100 |
| 4* | 113 | 32 | 6.7 | 3.2 | 99.2 | 600 |
| 5* | 110 | 44 | 6.5 | 3.3 | 97.6 | 600 |
| 6* | 106 | 51 | 6.2 | 3.1 | 91.6 | 600 |
| 7 | 120 | 88 | 6.6 | 5.1 | 99.3 | 950 |

(Note)
Samples with * in the table are comparative examples.

As apparent from the above results, each sintered body of the examples of the present invention exhibited a high bending strength and a favorable fracture toughness at the ordinary temperature and at 1300° C. On the other hand, in sample 4 of comparative example, since no heat treatment for crystallization was conducted, the grain boundary phase was in the form of the glass phase and the bending strength and the fracture toughness at a high temperature were dropped suddenly because. In addition, sample 5 as a comparative example could provide only a brittle sintered body because the amount of Si$_3$N$_4$ and sialon were too small while sample 6 was not sintered well because the amount of the sintering aid component was too small, both of which were poor in strength and toughness. Furthermore, apparently, though the maximum temperature for the heat treatment of sample 1 was equal to that of sample 7, i.e., 1500° C., sample 1 subjected to the crystal nucleation step was superior in high temperature properties to sample 7 without the crystal nucleation step.

EXAMPLE 2

α-Si$_3$N$_4$ powder having an average grain size of 0.8 μm, β-Si$_3$N$_4$ powder having an average grain size of 1.2 μm, and, as sintering aids, a composite compound Y$_3$Al$_5$O$_{12}$ powder having an average grain size of 0.8 μm, which was produced in the same similar manner as set forth in Example 1, and AlN powder or MgO powder having an average grain size of 1.0 μm were mixed at a ratio shown in Table 5 below.

TABLE 5

| | Si$_3$N$_4$ powder (wt. %) | | Y$_3$Al$_5$O$_{12}$ (wt. %) | AlN (wt. %) | MgO (wt. %) |
| --- | --- | --- | --- | --- | --- |
| Sample | α-type | β-type | | | |
| 8 | 95 | 0 | 5 | 0 | 0 |
| 9 | 70 | 20 | 8 | 1 | 1 |
| 10 | 82 | 1 | 16 | 0 | 1 |
| 11 | 90 | 5 | 5 | 0 | 0 |
| 12* | 62 | 37 | 1 | 0 | 0 |
| 13* | 50 | 27 | 22 | 0 | 1 |
| 14* | 53 | 30 | 15 | 1 | 1 |

(Note)
Samples with * in the table are comparative examples.

Three parts by weight of polyethylene amine as a dispersing agent and 120 parts by weight of ethanol as a solvent were added to 100 parts by weight of each of the powder mixtures and mixed homogeneously by using alumina balls.

The resultant mixture was then dried and press compacted to have a rectangular parallelopiped shape. Each compact was heated in vacuum to 600° C., and held for 1 hour to degrease. Each compact was sintered for 4 hours in a pressurized nitrogen atmosphere of 6 atm, during which the sintering temperature was 1800° C. for samples 8 and 12, 1825° C. for sample 9, 1850° C. for samples 10 and 13, and 1900° C. for samples 11 and 14.

The resultant Si$_3$N$_4$ sintered body was machined into a transverse test piece shape and subjected to heat treatment in a nitrogen atmosphere of 1.4 atm. In this event, the heat treatment was conducted for 5 hours at 1550° C. on samples 8 through 10 after holding them for 4 hours at 1100° C., while the heat treatment was conducted for 6 hours at 1500° C. on sample 11 after holding it for 4 hours at 1050° C. Samples 12 and 13, which were comparative examples, were held at 1100° C. for 4 hours and then subjected to heat treatment at 1430° C. for 7 hours. No heat treatment was conducted on sample 14.

For each sintered body after the heat treatment, crystal components contained in the grain boundary phase were measured as in Example 1. The β, β' quantitative ratio in the major phase, and a ratio of the total sum of the main peak intensities in the X-ray diffraction pattern for all the crystal components in the grain boundary phase relative to the X-ray diffraction main peak intensity of β-Si$_3$N$_4$ (i.e., the peak intensity of (200) indicated in a JCPDS33-1160 card for β-Si$_3$N$_4$) and/or the corresponding X-ray diffraction main peak intensity of β'-sialon in the silicon nitride (hereinafter, referred to as a grain boundary crystal quantitative ratio) are shown in Table 6. More specifically, grain boundary crystal quantitative ratio is defined by the following equation.

$$\text{grain boundary crystal quantitative ratio} = I_G/[I(\beta\text{-Si}_3\text{N}_4) + I(\beta'\text{-sialon})],$$

wherein $I_G$ is the total of main peak intensities in the X-ray diffraction pattern for all the crystal components in the grain boundary phase and $I(\beta\text{-Si}_3\text{N}_4)$ and $I(\beta'\text{-sialon})$ are an X-ray diffraction main peak intensity of $\beta\text{-Si}_3\text{N}_4$ and an X-ray diffraction main peak intensity of $\beta'$-sialon, respectively, in the major phase. In addition, among samples 8 to 11, the major phase of the samples 8 and 11 was formed of $\text{Si}_3\text{N}_4$ alone.

TABLE 6

| Sample | Crystal components in grain boundary phase | β, β' quantitative ratio | Grain boundary crystal quantitative ratio |
|---|---|---|---|
| 8 | $Y_2Si_2O_7$, $YSiNO_2$ | 0.83 | 0.2 |
| 9 | $Y_2Si_2O_7$, $Y_3Al_5O_{12}$ | 0.91 | 0.9 |
| 10 | $Y_2Si_2O_7$, $Si_3N_4.Y_2O_3$ | 0.98 | 0.5 |
| 11 | $Y_2Si_2O_7$, $YSiNO_2$, $Y_3Al_5O_{12}$ | 0.98 | 0.2 |
| 12* | $Y_2Si_2O_7$ | 0.81 | 0.03 |
| 13* | $Si_3N_4.Y_2O_3$, $Y_2SiO_5$ | 0.95 | 1.1 |
| 14* | None | 0.96 | 0 |

(Note)
Samples with * in the table are comparative examples.

In addition, a relative density was obtained as well as three-point bending strength at an ordinary temperature and at 1300° C., a fracture toughness $K_{IC}$, and a thermal shock resistance were measured on the resultant sintered body of each sample. The results are given in Table 7.

TABLE 7

| Sample | Bending strength (kg/mm$^2$) Ordinary temperature | Bending strength (kg/mm$^2$) 1300° C. | Fracture toughness (MPa$^{3/2}$) Ordinary temperature | Fracture toughness (MPa$^{3/2}$) 1300° C. | Relative density (%) | Thermal shock resistance (°C.) |
|---|---|---|---|---|---|---|
| 8 | 123 | 95 | 7.6 | 5.9 | 99.5 | 1200 |
| 9 | 126 | 94 | 8.3 | 5.7 | 99.4 | 1100 |
| 10 | 128 | 94 | 7.9 | 5.9 | 99.1 | 1100 |
| 11 | 128 | 94 | 8.1 | 5.7 | 99.3 | 1150 |
| 12* | 83 | 48 | 5.1 | 3.1 | 94.8 | 800 |
| 13* | 71 | 43 | 3.4 | 2.2 | 92.8 | 600 |
| 14* | 113 | 40 | 5.0 | 3.1 | 99.0 | 600 |

(Note)
Samples with * in the table are comparative examples.

As apparent from the above results, each sintered body of the examples of the present invention exhibited a high bending strength and a favorable fracture toughness at the ordinary temperature and at 1300° C. On the other hand, sample 12 and sample 13 were both inferior in bending strength and fracture toughness because the weight amount of $Si_3N_4$ in sample 12 was 99% by weight, which was more than 98% by weight, and the amount of $Si_3N_4$ in sample 13 was 77% by weight, which was less than 80% by weight, respectively. Deterioration in bending strength and fracture toughness was remarkable particularly at a high temperature. They were also poor in thermal shock resistance.

EXAMPLE 3

$\alpha$-$Si_3N_4$ powder having an average grain size of 0.7 µm, $\beta$-$Si_3N_4$ powder having an average grain size of 1.5 µm, and, as a sintering aid, a composite compound $Y_3Al_5O_{12}$ powder having an average grain size of 0.8 µm which was produced in the same manner as set forth in Example 1 were mixed at a ratio shown in Table 8 below.

TABLE 8

| Sample | $Si_3N_4$ powder (wt. %) α-type | $Si_3N_4$ powder (wt. %) β-type | β-proportion of powder | $Y_3Al_5O_{12}$ (wt. %) |
|---|---|---|---|---|
| 15 | 90 | 0 | 0 | 10 |
| 16 | 65 | 25 | 0.28 | 10 |
| 17 | 57 | 33 | 0.37 | 10 |
| 18 | 45 | 45 | 0.50 | 10 |
| 19 | 33 | 57 | 0.63 | 10 |
| 20 | 2 | 88 | 0.98 | 10 |

Three parts by weight of polyethylene amine as a dispersing agent and 120 parts by weight of ethanol as a solvent were added to 100 parts by weight of each of the powder mixtures and mixed homogeneously by using alumina balls. The resultant mixture was then dried and press compacted to have a rectangular parallelopiped shape. Each compact was heated in vacuum to 600° C., and held for 1 hour to degrease. Each compact was sintered at 1850° C. for 4 hours in a pressurized nitrogen atmosphere of 6 atm.

The resultant sintered body was machined into a transverse test piece shape and heat treatment was conducted in a nitrogen atmosphere of 1.4 atm by means of holding it at 1100° C. for 3 hours and then holding it at 1500° C. for 4 hours. For each sintered body after the heat treatment, the β, β' quantitative ratio in the major phase was obtained by means of the X-ray diffraction, and, in addition, crystal components contained in the grain boundary phase were measured, and a grain boundary crystal quantitative ratio thereof was obtained, as in Examples 1 and 2. Results thereof are shown in Table 9.

TABLE 9

| Sample | Crystal components in grain boundary phase | β, β' quantitative ratio | Grain boundary crystal quantitative ratio |
|---|---|---|---|
| 15 | $Y_2Si_2O_7$, $Y_3Al_5O_{12}$, $YAlO_3$ | 0.90 | 0.27 |
| 16 | $Y_2Si_2O_7$, $Si_3N_4.Y_2O_3$ | 0.97 | 0.71 |
| 17 | $Y_2Si_2O_7$, $Y_3Al_5O_{12}$ | 1.0 | 0.5 |
| 18 | $Y_2Si_2O_7$, $YSiNO_2$ | 1.0 | 1.11 |
| 19 | $Y_3Al_5O_{12}$, $Y_2Si_2O_7$ | 1.0 | 0.63 |
| 20 | $Y_2Si_2O_7$, $YAlO_3$ | 1.0 | 0.6 |

In addition, a relative density was obtained as well as three-point bending strength at an ordinary temperature and at 1300° C., a fracture toughness $K_{IC}$, and a thermal shock resistance were measured on the sintered body of each sample. The results are given in Table 10.

Figure 2:
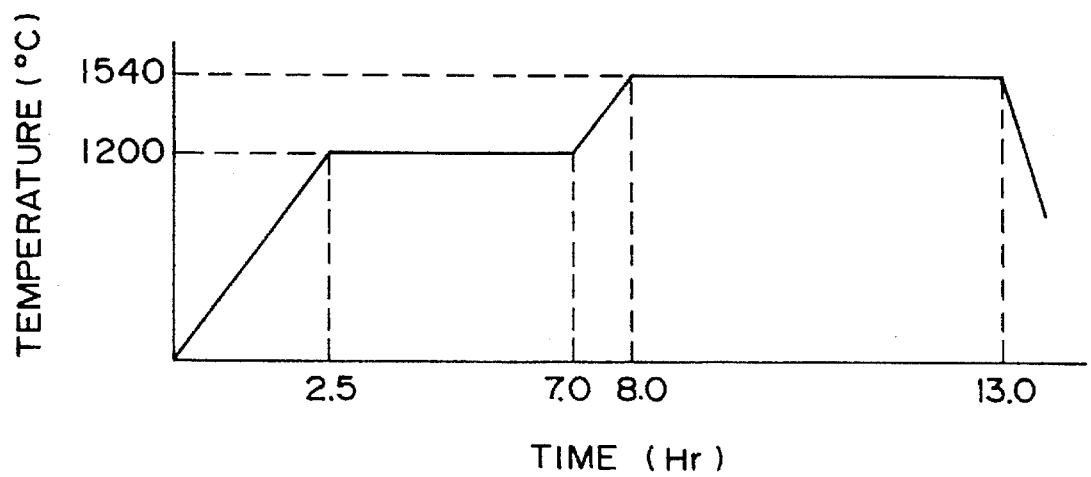
FIG. 2 is a graphical representation showing a heat treatment program for the crystallization used in Example 4.

The resultant sintered body was machined into a transverse test piece shape, and heat treatment was conducted by holding it at 1200° C. for 4.5 hours and then holding at 1540° C. for 5 hours in a nitrogen atmosphere of 1.4 atm according to the heat treatment program shown in FIG. 2.

TABLE 10

| Sample | Bending strength (kg/mm²) Ordinary temperature | 1300° C. | Fracture toughness (MPa^{3/2}) Ordinary temperature | 1300° C. | Relative density (%) | Thermal shock resistance (°C.) |
|---|---|---|---|---|---|---|
| 15 | 128 | 93 | 7.6 | 5.8 | 99.4 | 1100 |
| 16 | 124 | 92 | 7.8 | 5.4 | 99.2 | 1200 |
| 17 | 126 | 92 | 8.1 | 5.9 | 99.2 | 1100 |
| 18 | 124 | 93 | 7.6 | 5.8 | 99.3 | 1200 |
| 19 | 114 | 81 | 6.6 | 4.3 | 98.1 | 900 |
| 20 | 110 | 70 | 6.6 | 3.7 | 97.6 | 900 |

As apparent from the above results, each sintered body of the present invention exhibited a high bending strength and a favorable fracture toughness at the ordinary temperature and at 1300° C., and the thermal shock resistance thereof was good. The strength, the fracture toughness, and the thermal shock resistance are deteriorated when the contents of a β-phase of the Si3N4 powder exceeds 50% (samples 19 and 20), so that it is preferable the β-type silicon nitride powder be 50% by weight or less.

EXAMPLE 4

Mixed were 90% by weight of α-$Si_3N_4$ powder having an average grain size of 0.7 μm, 2% by weight of β-$Si_3N_4$ powder having an average grain size of 1.5 μm, and, as sintering aids, 6% by weight of a composite compound $Dy_3Al_5O_{12}$ powder having an average grain size of 0.8 μm which was produced in the same manner as set forth in Example 1 by using $Dy_2O_3$ in place of $Y_2O_3$ in Example 1, 1% by weight of AlN powder and the same amount of MgO powder.

Three parts by weight of polyethylene amine as a dispersing agent, and 120 parts by weight of ethanol as a solvent, were added to 100 parts by weight of this mixed powder and mixed homogeneously by using alumina balls. The resultant mixture was dried and then compacted into a disk of 70 mm in size and 8 mm in thickness through isostatic pressing at 5 t/cm².

Next, each compact was heated in vacuum to 600° C., held for 1 hour to degrease, and was then sintered at 1800° C. in a pressurized nitrogen atmosphere of 6 atm. The sintering time for each sample is, 1 hour for sample 21, 2 hours for sample 22, 4 hours for sample 23, 5 hours for sample 24, and 7 hours for sample 25.

For each sintered body after the heat treatment the size of the major axis of β-$Si_3N_4$ and β'-sialon in the major phase, and average values of the aspect ratio thereof were each measured. In addition, the β, β' quantitative ratio in the major phase by means of the X-ray diffraction, crystal components contained in the grain boundary phase, and a grain boundary crystal quantitative ratio thereof were obtained, as in Examples 1 and 2. Results thereof are shown in Table 11.

TABLE 11

| Sample | β, β' grains Size in major axis (μM) | Aspect ratio | β, β' quantitative ratio | Grain boundary crystal quantitative ratio | Crystal components in grain boundary phase |
|---|---|---|---|---|---|
| 21 | 0.9 | 1.5 | 0.86 | 0.20 | $Dy_2Si_2O_7$, $DySiNO_2$ |
| 22 | 3.3 | 6.7 | 0.90 | 0.21 | $Dy_2Si_2O_7$, $DySiNO_2$ |
| 23 | 9.1 | 9.0 | 0.93 | 0.23 | $Dy_2Si_2O_7$, $DySiNO_2$ |
| 24 | 5.9 | 1.0 | 1.0 | 0.16 | $Dy_2Si_2O_7$, $DyAlO_3$ |
| 25 | 9.9 | 12 | 1.0 | 0.14 | $Dy_2Si_2O_7$, $DyAlO_3$ |

In addition, a relative density was obtained as well as three-point bending strength at an ordinary temperature and at 1300° C., a fracture toughness $K_{IC}$, and a thermal shock resistance were measured on the sintered body of each sample. The results are given in Table 12.

TABLE 12

| Sample | Bending strength (kg/mm²) Ordinary temperature | 1300° C. | Fracture toughness (MPa^{3/2}) | Relative density (%) | Thermal shock resistance (°C.) |
|---|---|---|---|---|---|
| 21 | 123 | 93 | 7.8 | 99.3 | 1200 |
| 22 | 126 | 92 | 7.8 | 99.4 | 1100 |
| 23 | 128 | 93 | 7.0 | 99.4 | 1100 |
| 24 | 113 | 78 | 6.3 | 97.8 | 700 |
| 25 | 108 | 73 | 6.1 | 98.1 | 700 |

As apparent from the above results, each sintered body of samples 21 through 23 exhibited a high bending strength and a favorable fracture toughness at the ordinary temperature and at 1300° C., and the thermal shock resistance thereof was good because the aspect ratio of the β-$Si_3N_4$ and/or β'-sialon grains is within the range of from 1.4 to 10. This indicates that it is more preferable the aspect ratio of the β-$Si_3N_4$ and β'-sialon grains be within the range of from 1.4 to 10.

EXAMPLE 5

Mixed were 96% by weight of α-$Si_3N_4$ powder having an average grain size of 0.5 μm, and, as a sintering aid, 4% by weight of a composite compound $Y_3Al_5O_{12}$ powder having an average grain size of 0.8 μm which was produced in the same manner as described in Example 1.

Three parts by weight of polyethylene amine as a dispersing agent and 120 parts by weight of ethanol as a solvent were each added to 100 parts by weight of the above mentioned mixed powder and mixed homogeneously by using alumina balls. The resultant mixture was dried, and compacted into a disk of 70 mm in diameter and 8 mm in thickness through isostatic pressing at 5 t/cm². Each compact was heated in vacuum to 600° C., and held for 1 hour to degrease.

Figure 4:
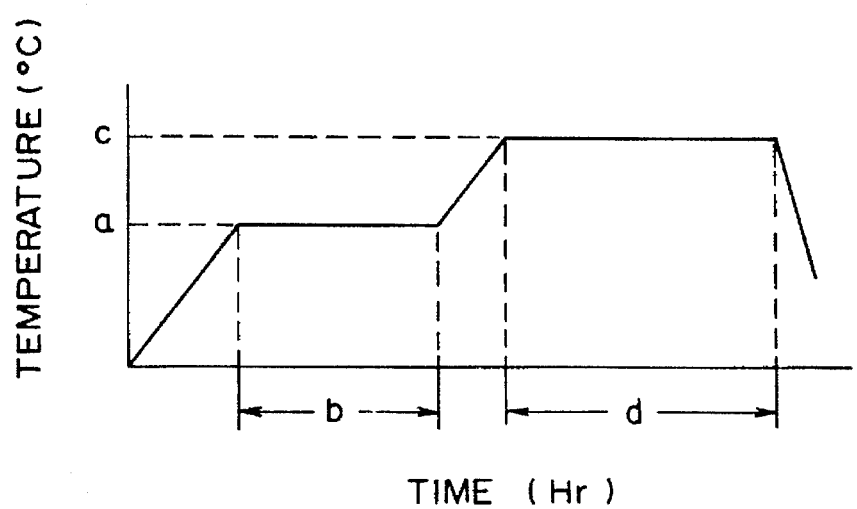
FIG. 4 is a graphical representation showing a two-step heat treatment program for the crystallization used in Example 5.

Next, each sample using the above mentioned composite compound as a sintering aid, and sample 39 using a mixture of monocompounds corresponding to this composite compound were each sintered at 1850° C. for 3 hours. The resultant sintered body was machined into a transverse test piece shape, and then heat treatment was conducted in a nitrogen atmosphere of 2.0 atm (in the air for sample 38) with a crystallization treatment pattern comprising two steps of nucleation treatment and crystal growth treatment shown in FIG. 4 (one step only for sample 29). A temperature "a" and a holding time "b" for the nucleation treatment, and a temperature "c" and a holding time "d" for the crystal growth treatment during it are shown in Table 13 below. A temperature rise rate was 10° C./min. and cooling was natural cooling for each case.

TABLE 13

| | Nucleation treatment | | Crystal growth treatment | |
|---|---|---|---|---|
| Sample | a (°C.) | b (Hr) | c (°C.) | d (Hr) |
| 26 | 1100 | 8.0 | 1480 | 12.0 |
| 27 | 1100 | 5.0 | 1550 | 9.0 |
| 28 | 1100 | 4.0 | 1450 | 5.0 |
| 29 | — | — | 1480 | 12.0 |
| 30* | 800 | 8.0 | 1480 | 12.0 |
| 31 | 1480 | 4.0 | 1550 | 6.0 |
| 32 | 1100 | 0.3 | 1550 | 8.0 |
| 33 | 1100 | 16 | 1550 | 8.0 |

TABLE 13-continued

| | Nucleation treatment | | Crystal growth treatment | |
|---|---|---|---|---|
| Sample | a (°C.) | b (Hr) | c (°C.) | d (Hr) |
| 34* | 1000 | 4.0 | 1850 | 8.0 |
| 35 | 1050 | 4.0 | 1100 | 8.0 |
| 36* | 1100 | 4.0 | 1550 | 0.3 |
| 37* | 1100 | 4.0 | 1550 | 34.0 |
| 38* | 1070 | 8.0 | 1480 | 12.0 |
| 39 | 1200 | 5.0 | 1550 | 8.0 |
| 40* | — | — | — | — |

(Note)
Samples with * in the table are comparative examples. Sample 29 is an example of the present invention through the one-step heat treatment, while sample 40 is a comparative example subjected to no heat treatment. In addition, sample 38 was subjected to the heat treatment in the air. Sample 39 used as sintering aid a mixture of monocompounds $Y_2O_3$ and $Al_2O_3$ in place of the composite compound $Y_3Al_5O_{12}$.

For each sintered body after the heat treatment, grain boundary crystal components were examined by means of the X-ray diffraction, and a grain boundary crystal quantitative ratio was obtained, as in Examples 1 and 2. Results thereof are shown in Table 14 below.

TABLE 14

| Sample | Grain boundary crystal quantitative ratio | Crystal components in grain boundary phase |
|---|---|---|
| 26 | 0.31 | $Y_2Si_2O_7$, $YSiNO_2$, $Y_3Al_5O_{12}$ |
| 27 | 0.38 | $Y_2Si_2O_7$, $YSiNO_2$, $YAlO_3$, $Y_{10}Al_2Si_3O_{18}N_4$ |
| 28 | 0.04 | $Y_2Si_2O_7$, $YAlO_3$ |
| 29 | 0.03 | $Y_2Si_2O_7$, $Si_3N_4$·$Y_2O_3$ |
| 30* | 0.01 | $Y_2SiO_5$ |
| 31 | 0.03 | $Y_2Si_2O_7$, $Y_3Al_5O_{12}$ |
| 32 | 0.03 | $Y_2Si_2O_7$, $YSiNO_2$, $YAlO_3$ |
| 33 | 0.32 | $Y_2Si_2O_7$, $YSiNO_2$, $YAlO_3$, $Y_{10}Al_2Si_3O_{18}N_4$ |
| 34* | 0.02 | $YSiNO_2$ |
| 35 | 0.03 | $Y_2Si_2O_7$, $YSiNO_2$ |
| 36* | 0.01 | $Si_3N_4$·$Y_2O_3$ |
| 37* | 0.05 | $Y_2Si_2O_7$, $Si_3N_4$·$Y_2O_3$ |
| 38* | 0.03 | $Y_2SiO_5$ |
| 39 | 0.11 | $Y_2Si_2O_7$, $YAlO_3$, $Y_3Al_5O_{12}$ |
| 40* | 0 | None |

(Note)
Samples with * in the table are comparative examples.

In addition, three-point bending strength and a fracture toughness $K_{IC}$ at an ordinary temperature and at 1300° C., and hardness as well as a thermal shock resistance at an ordinary temperature and at 1300° C. were measured on each resultant sintered body. The results are given in Table 15 below. The surface of the sintered bodies of samples 33 and 37 was observed to be rough, while a part of the sintered body was sublimated in sample 34.

TABLE 15

| Sample | Bending strength (kg/mm²) | | Fracture toughness (MPa^{3/2}) | | Relative density (%) | Hardness (H) | | Thermal shock resistance (°C.) |
|---|---|---|---|---|---|---|---|---|
| | Ordinary temperature | 1300° C. | Ordinary temperature | 1300° C. | | Ordinary temperature | 1300° C. | |
| 26 | 126 | 93 | 7.7 | 5.7 | 99.5 | 1532 | 1050 | 1200 |
| 27 | 123 | 94 | 7.7 | 6.3 | 99.4 | 1543 | 1038 | 1200 |
| 28 | 130 | 93 | 7.4 | 6.0 | 99.5 | 1540 | 1041 | 1100 |
| 29 | 120 | 90 | 6.5 | 5.1 | 99.5 | 1538 | 980 | 950 |
| 30* | 111 | 44 | 6.1 | 2.5 | 97.4 | 1509 | 911 | 600 |
| 31 | 122 | 92 | 7.0 | 5.2 | 99.3 | 1530 | 978 | 950 |
| 32 | 122 | 92 | 7.0 | 5.2 | 99.2 | 1521 | 983 | 950 |
| 33 | 123 | 92 | 7.3 | 5.3 | 99.4 | 1520 | 980 | 950 |
| 34* | 114 | 41 | 6.2 | 3.1 | 93.4 | 1423 | 879 | 800 |
| 35 | 122 | 92 | 7.1 | 5.3 | 99.4 | 1530 | 974 | 950 |
| 36* | 116 | 41 | 6.1 | 3.0 | 99.2 | 1522 | 903 | 600 |
| 37* | 115 | 87 | 6.2 | 3.0 | 99.5 | 1531 | 901 | 800 |
| 38* | 80 | 30 | 6.3 | 2.8 | 94.8 | 1479 | 819 | 400 |
| 39 | 123 | 92 | 7.3 | 4.9 | 99.3 | 1520 | 980 | 900 |
| 40* | 108 | 40 | 6.3 | 2.4 | 99.3 | 1476 | 891 | 400 |

(Note)
Samples with * in the table are comparative examples.

From the above results, $Y_2Si_2O_7$ is precipitated in all cases in the grain boundary phase of the samples according to the present invention, with which crystal components such as $YSiNO_2$, $Y_3Al_5O_{12}$, $YAlO_3$, and $Si_3N_4 \cdot Y_2O_3$ are precipitated along. On the other hand, such a combination of crystal components were not obtained in the crystal phase of the samples of the comparative examples. Samples 26 and 29 are equal in maximum temperature and treatment time at that temperature during the heat treatment, i.e., at 1480° C. for 12 hours, respectively. It is indicated, however, that sample 26 with the crystal nucleation step is superior in high temperature properties. In addition, sample 29 is superior in high temperature properties to sample 40 on which no heat treatment was made. Furthermore, the samples of the present invention are far superior in bending strength and fracture toughness at an ordinary temperature and at a high temperature to the samples of the comparative examples.

EXAMPLE 6

Figure 5:
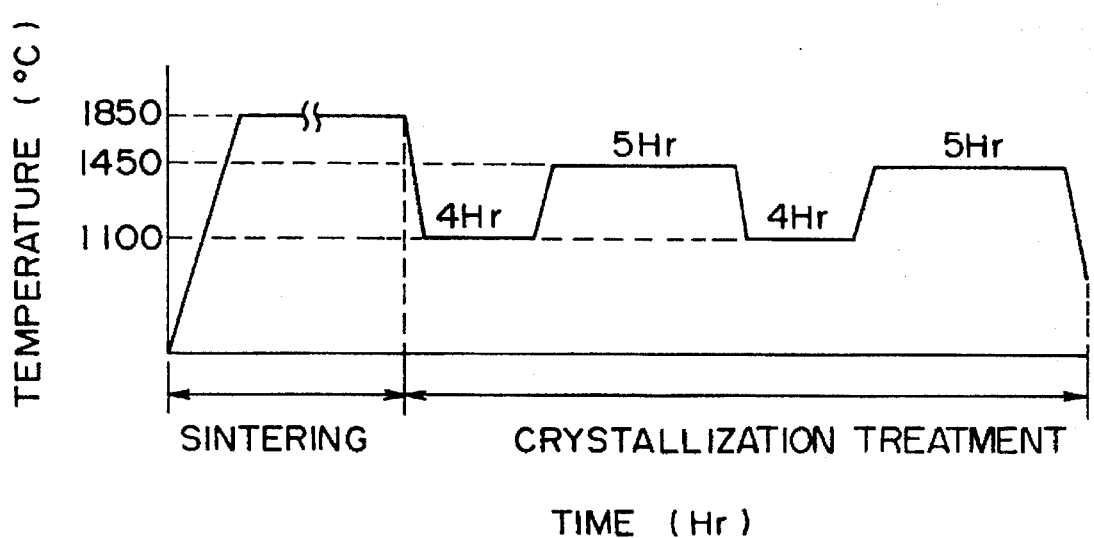
FIG. 5 is a graphical representation showing a two-cycle heat treatment program for the crystallization used in Example 6.

A sintered body was made with the addition of the composite compound $Y_3Al_5O_{12}$ powder as in Example 5. The sintered body was heat treated continuously in the same conditions as in sample 28 in Example 5 to provide sample 41 of this example. In addition, another sintered body was made in a similar manner and the heat treatment of repeating two times a crystallization treatment comprising nucleation and crystal growth shown in FIG. 5 was conducted on this sintered body to provide sample 42 of the inventive example. Subsequently, these samples were machined into a cutting tool shape of model number SNG434.

Furthermore, a sintered body produced in a similar manner to in Example 5 as above was machined into a cutting tool shape of model number SNG434 and was then heat treated in the same conditions as in sample 28 in Example 5 to provide sample 43 of this example. In addition, the sintered body was machined likewise and subjected to the heat treatment shown in FIG. 5 to obtain sample 44 of the inventive example. As a comparative example, the one subjected to no heat treatment on the machined sintered body was provided as sample 45.

For each of these samples, all crystal components in the grain boundary phase and the grain boundary crystal quantitative ratio thereof were obtained by means of the X-ray diffraction as in Examples 1 and 2. The crystal components in the grain boundary phase in samples 41 through 44 were $Y_2Si_2O_7$ and $YAlO_3$ as in sample 28 shown in Table 14 in Example 5, while no crystal component was precipitated in sample 45.

For the sintered body of each sample, the three-point bending strength at an ordinary temperature and at 1300° C., the fracture toughness at an ordinary temperature, a relative density, and a thermal shock resistance were obtained. For the purpose of evaluating machining performance, one hundred FC250 disk brakes as materials to be machined were wet machined under the cutting conditions of V=400 m/min., f=0.1 mm/rev., and d=2.0 mm, to obtain a wear loss of these chips.

Furthermore, with test pieces each having a diameter of 8 mm and a length of 25 mm formed of the individual samples produced as set forth above, a friction and wear test was conducted at 500° C. to obtain a specific wear loss. Steel was used for the material to be contacted, under 900 rpm in rotation speed and 300N in load. These results are shown together in Table 16 below.

TABLE 16

| Sample | Grain boundary crystal quantitative ratio | Strength (kg/mm$^2$) Ordinary temperature | Strength (kg/mm$^2$) 1300° C. | Fracture toughness (MPa$^{3/2}$) | Density (%) | Thermal shock resistance (°C.) | Wear loss in cutting test (mm) | Specific wear loss |
|---|---|---|---|---|---|---|---|---|
| 41 | 0.04 | 122 | 92 | 7.1 | 99.5 | 1100 | 0.316 | 6.8 |
| 42 | 0.23 | 135 | 97 | 8.6 | 99.5 | 1200 | 0.273 | 5.6 |
| 43 | 0.04 | 128 | 95 | 7.6 | 99.5 | 1150 | 0.298 | 6.0 |
| 44 | 0.23 | 138 | 103 | 8.7 | 99.5 | 1200 | 0.216 | 4.0 |
| 45* | None | 121 | 32 | 6.3 | 99.4 | 800 | 0.623 | 13.0 |

(Note)
Samples with * in the table are comparative examples. A unit of the specific wear loss is × 10$^{-9}$ mm$^3$/N · mm.

From the results of the above mentioned cutting test, it is indicated that the high temperature properties and the cutting properties are better when the heat treatment was conducted after sintering and once machining rather than when the heat treatment was conducted successively after the sintering. In addition, it was revealed that the properties are further improved when the heat treatment was conducted successively two or more times rather than was terminated at one time.

In addition, in the friction and wear test, the wear loss is the smallest in sample 44 which was heat treated two times after sintering and machining. Sample 45 on which no heat treatment for the crystallization was conducted is suffered from the largest wear loss. These results indicated that the crystallization of the grain boundary phase improved the wear-resistance.

EXAMPLE 7

A sintered body obtained in a similar manner to sample 9 in the Example 2 was taken out of a furnace and machined into a test piece for evaluation of mechanical properties and a cutting test piece. Each test piece was then subjected to the following heat treatment.

Figure 6:
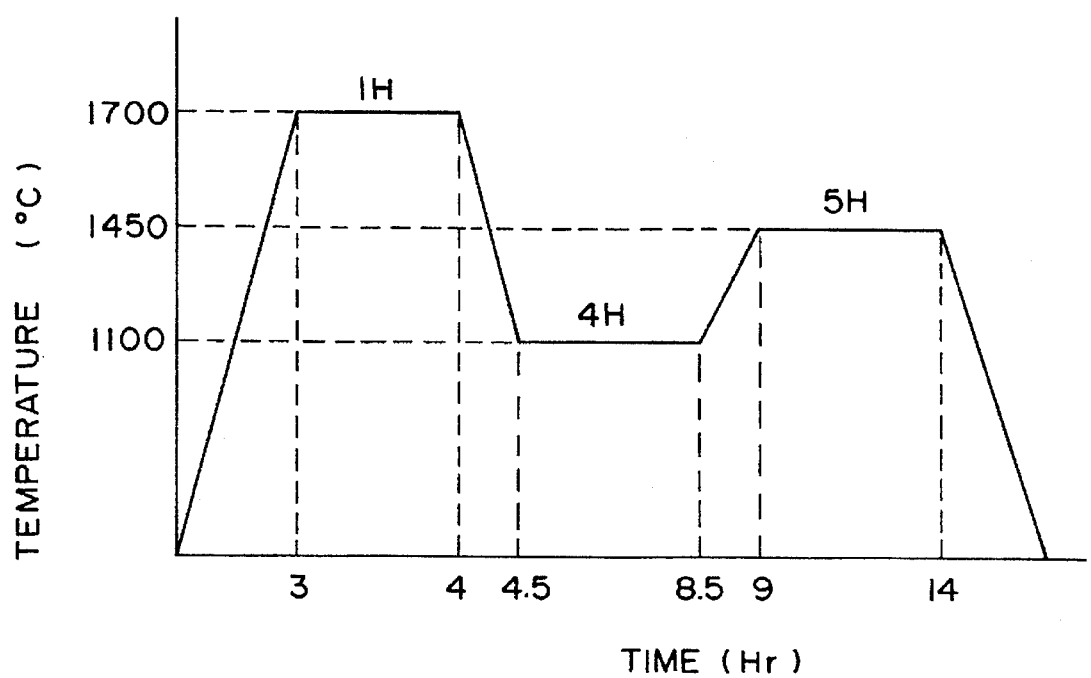
FIG. 6 is a graphical representation showing a heat treatment program for the crystallization used in Example 7.
Figure 7:
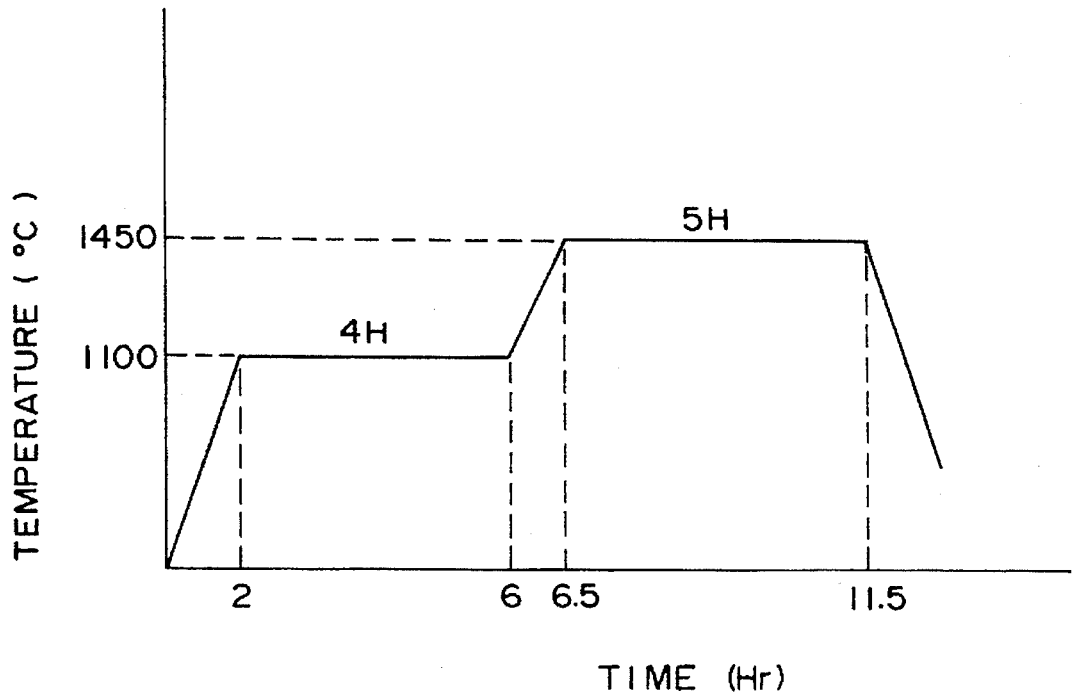
FIG. 7 is a graphical representation showing another heat treatment program for the crystallization used in Example 7.

Sample 46 was, as shown in FIG. 6, heated once from the ordinary temperature to 1700° C. and kept at this temperature for 1 hour, cooled to 1100° C. and held at this temperature for 4 hours. Further, this sample was held at 1450° C. for 5 hours. Sample 47 was, as shown in FIG. 7, heated from the ordinary temperature to 1100° C. and held at this temperature for 4 hours. Further, this sample was then heated to 1450° C. and held at this temperature for 5 hours. For the purpose of comparison, a test piece was made as sample 48 without being subjected to the heat treatment.

For each sample after the heat treatment, crystal components in the grain boundary phase and the grain boundary crystal quantitative ratio thereof were obtained as in Example 6. The results are given in Table 17. In addition, each test piece prepared for mechanical properties thereof was examined for bending strength and the fracture toughness in the same manner as in Example 6. The results of which are given in Table 18. Each cutting test piece prepared by machining each sintered body into SNMN434 was tested for evaluation of cutting performance thereof. The cutting test conditions are: V=700 m/min., f=0.3 mm/rev., and d=1.5 mm to examine the wear state after cutting fifty disk-shaped FC250 materials having a diameter of 200 mm. The results obtained are also given in Table 18.

TABLE 17

| Sample | Grain boundary crystal quantitative ratio | Crystal components in grain boundary phase |
|---|---|---|
| 46 | 0.96 | Y$_2$Si$_2$O$_7$, YAlO$_3$ |
| 47 | 0.84 | Y$_2$Si$_2$O$_7$, Y$_3$Al$_5$O$_{12}$, YAlO$_3$ |
| 48* | 0 | None |

(Note)
Samples with * in the table are comparative examples.

TABLE 18

| Sample | Bending strength (kg/mm$^2$) Ordinary temperature | Bending strength (kg/mm$^2$) 1300° C. | Fracture toughness (MPa$^{3/2}$) Ordinary temperature | Fracture toughness (MPa$^{3/2}$) 1300° C. | Cutting performance wear loss (mm) |
|---|---|---|---|---|---|
| 46 | 124 | 94 | 7.9 | 6.1 | 0.377 |
| 47 | 122 | 92 | 7.4 | 5.8 | 0.485 |
| 48* | 120 | 34 | 7.8 | 2.7 | 0.798 |

(Note)
Samples with * in the table are comparative examples.

It was indicated that a larger amount of crystal phase was formed and the high temperature properties are superior through the process where the temperature was once increased to a temperature at which the grain boundary phase was converted into the liquid phase state and, during the cooling, the crystal nuclei was formed, and grown.

EXAMPLE 8

Sintering and heat treatment were conducted under the same conditions as in sample 26 in Example 5 to make a guide roller for use in wire drawing with 58 mm in maximum outer diameter 25 mm in thickness. In addition, for the purpose of comparison, guide rollers of the same type as above were made under the same conditions as samples 30 and 40 in Example 5. The presence or absence of a crystal phase generated from the grain boundary phase of the sintered bodies used for these products, the type of the crystal phase, the crystal phase quantitative ratio, and mechanical properties were same as the results in Example 5.

With each of these guide rollers, a wire rod of stainless high carbon steel of 5.5 mm in diameter was wire-drawn at a rate of 45 mm/sec. The temperature of the contact surface at that time between the guide roller and the wire rod was increased to approximately 680° C. when measured by using a radiation thermometer. As a result of this wire drawing, the wear loss was a factor of lifetime in all guide rollers. However, the guide roller formed of sample 26 in Example 5 exhibited the lifetime of approximately three times as long as the one of sample 30, and approximately five times as long as the one of sample 40.

EXAMPLE 9

Sintering and heat treatment were conducted under the same conditions as in the sample 10 in Example 2 to produce a cutting tool of Model SNMN434. In addition, for the purpose of comparison, a cutting tool of the same model as above was made under the same conditions as in samples 12 and 14 in Example 2.

With each of these cutting tools, a cutting test was conducted under the following conditions to measure the wear loss caused in a flank after the test.

Cutting Conditions

Dry cutting

Peripheral speed: 500 mm/min

Feeding speed: 0.5 mm/rev

Depth of Cut: 2.0 mm

Material to be machined: FC250

Machined portion: φ200 mm disk brake edge surface

Machined number: 100 sheets

The temperature at the tip of the chip during cutting under this cutting condition was heated to about 920° C. when measured by using an infrared thermometer. As a result of this cutting test, the notch wear of the flank of the cutting tool formed of sample 10 was 0.268 mm, while the wear loss of the flank of the cutting tool formed of samples 12 and 14 were 0.512 mm and 0.602 mm, respectively.

EXAMPLE 10

Sintering and heat treatment were conducted under the same conditions as in sample 1 in Example 1 to make a drawing mold of 120 mm in outer diameter and 30 mm in thickness. For the purpose of comparison, a drawing mold of the same type as above was made under the same conditions as in the samples 4 and 5 in Example 1.

With these drawing molds, a carbon steel tube STKM12B for mechanical structural use, which has an outer diameter of 80 mm, an inner diameter of 72 mm, and a length of 300 mm, was subjected to a drawing with a reduction of 0.8 mm in the outer diameter over the length of 50 mm from one end thereof. Drawing was conducted by using these drawing molds. As a result, the drawing molds formed of sample 1 enabled drawing of 120,000 shots while the drawing molds formed of samples 4 and 5 enabled drawing of only 50,000 shots and 60,000 shots, respectively. It is noted that, with a drawing mold of the same type made of a typical cemented carbide, working could be made only by 30,000 shots. A factor of the lifetime of these drawing mold was the wear of the drawing mold in all cases.

EXAMPLE 11

Sintering and heat treatment were conducted under the same conditions as in sample 28 in Example 5 to produce a carrier roller of 85 mm in outer diameter and 520 mm in length for transferring steel tubes. Using several tens of these rollers as carrier rollers for a batch annealing furnace, on the carrier rollers a steel plate of 300 mm in width, 500 mm in length, and 5 mm in thickness was rolled and carried at a rate of 20 km/h. The temperatures of the annealing furnace at the inlet and the outlet thereof are 1100° C. and 1320° C., respectively, and the atmosphere is in the air. Operation of carrying the steel plate was conducted continuously under this condition. As a result, the amount of wear of the rollers were 0.08 mm or smaller in all cases after the use for 15 days. Because of this the lifetime of the rollers in this case was 70 days.

In addition, for the purpose of comparison, sintering and heat treatment were conducted under the same conditions as in samples 32 and 40 to make rollers of the same type as above and subjected to the carrying operation of the steel plate under the same conditions. As a result, the amounts of wear of the roller after the use for 15 days was 0.18 mm and 0.25 mm for the rollers of samples 32 and 40, respectively, and the lifetimes were 30 days and 19 days, respectively. As another material, a roller of the same type made of SUS310S was suffered from a large amount of wear and had the lifetime of only 10 days.

According to the present invention, by precipitating the crystal components of a specific combination in the grain boundary phase of the sintered body having the major phase of the silicon nitride and/or the sialon, it is possible to provide a sintered silicon nitride-based body which has higher strength and fracture toughness, particularly at a high temperature, and also has the better thermal shock resistance than conventional ones.

In addition, this sintered silicon nitride-based body has excellent properties such as the strength and the fracture toughness as mentioned above, and is also excellent in the hardness and the wear-resistance at a high temperature, so that it is particularly useful for cutting tool materials, wear-resistant tool materials, and materials for structures.

What is claimed is:

1. A sintered silicon nitride-based body comprising 20% or less by weight of a grain boundary phase and the balance being a major phase of grains of silicon nitride and/or sialon, wherein;

said major phase contains a grain phase formed of a $\beta$-$Si_3N_4$ phase and/or a $\beta'$-sialon phase, and a quantitative ratio of the grain phase formed of the $\beta$-$Si_3N_4$ phase and/or the $\beta'$-sialon phase is in a range of from 0.5 to 1.0 relative to the major phase;

said grain boundary phase contains $Re_2Si_2O_7$ wherein Re represents a rare-earth element other than Er and Yb, which applies hereinbelow as a first crystal component and at least one of $ReSiNO_2$, $Re_3Al_5O_{12}$, $ReAlO_3$, and $Si_3N_4 \cdot Y_2O_3$ as a second crystal component; and a quantitative ratio of the first and second crystal components in the grain boundary phase to the grain phase of the $\beta$-$Si_3N_4$ phase and/or the $\beta'$-sialon phase in the major phase is in a range of from 0.03 to 1.6.

2. A sintered silicon nitride-based body as claimed in claim 1, wherein the $\beta$-$Si_3N_4$ grains and/or the $\beta'$-sialon grains have an average size of from 0.4 to 10 μm in the major axis, and an aspect ratio thereof is from 1.4 to 10.

* * * * *